Oct. 25, 1955     H. WALES     2,721,717
ELECTRIC-CORD HOLDER
Filed May 3, 1951
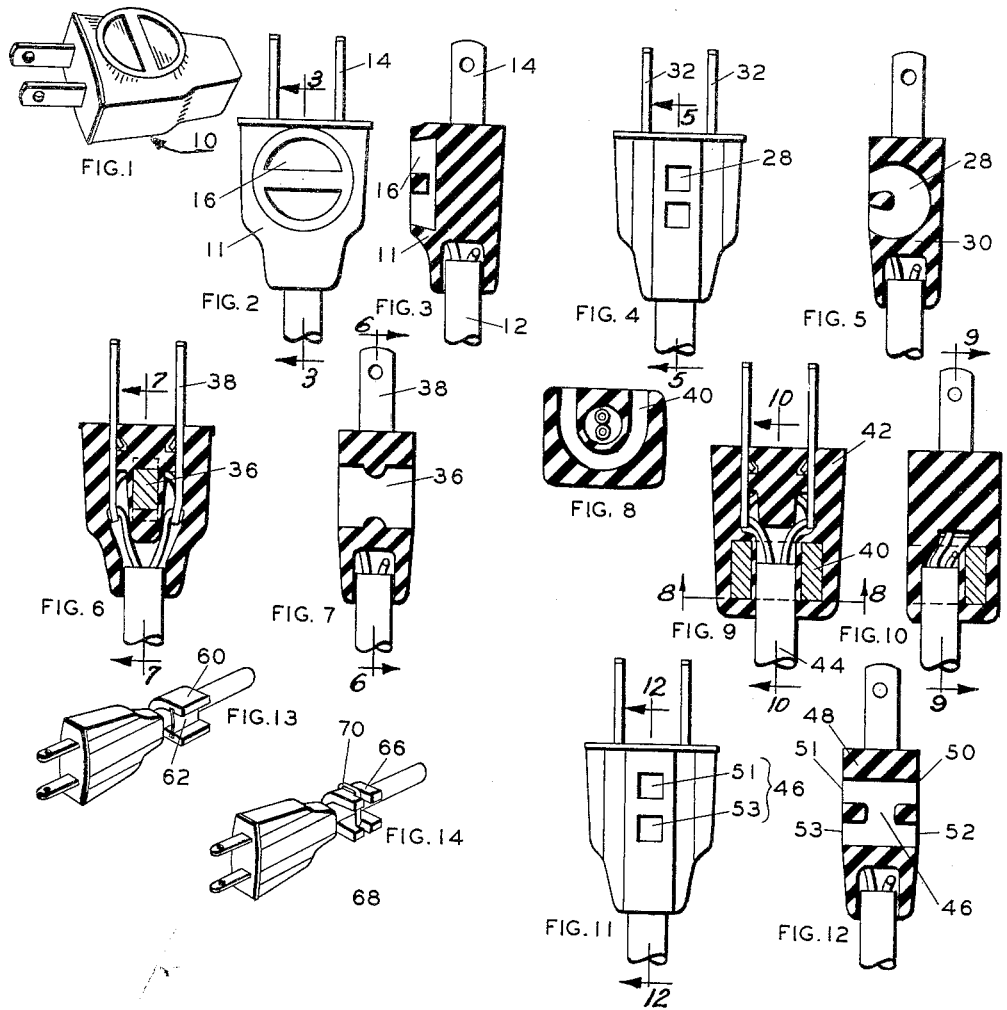
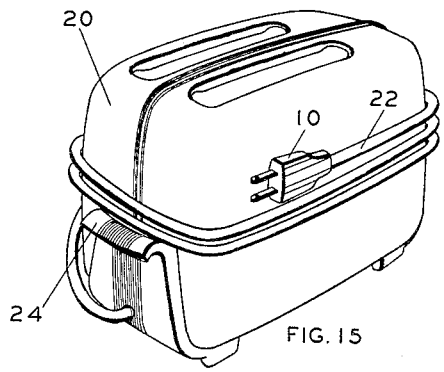
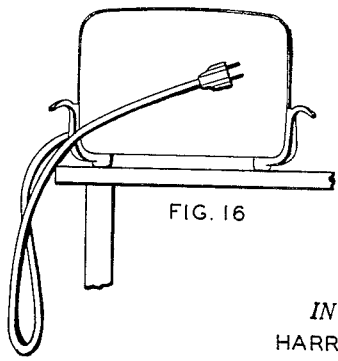
INVENTOR.
HARRY WALES
BY
*Karl W. Sommermeyer*
ATTORNEY

United States Patent Office 2,721,717
Patented Oct. 25, 1955

2,721,717

ELECTRIC-CORD HOLDER

Harry Wales, St. Paul, Minn., assignor to McGraw Electric Company, Elgin, Ill., a corporation of Delaware Application May 3, 1951, Serial No. 224,343

3 Claims. (Cl. 248—206)

The present invention relates to connecting plugs for electric power cords and particularly to such plugs for portable electric appliances.

The power cord of a portable electric appliance often makes trouble when the appliance is put away. If left loose the cord tangles up, ensnares other articles, looks untidy, and at best requires extra shelf space and careful stowage. Although the cord sometimes can be wrapped about appliance, often there is no good way to hold it wound, so that the cord falls loose when the appliance is handled or even while it stands on a shelf. For example, the polished, chromium-plated case of an electric toaster is so smooth that a textile-covered cord wrapped around it cannot be tied tight enough just by tucking the end of the cord into one of the loops. It is desirable to provide a convenient fastener for holding such a cord. It is further desirable to provide a fastener for temporarily holding the end of the cord of a toaster or other table appliance merely to keep the cord off the floor.

Objects of the invention include the provision of a new and improved holder for an electric cord connector, the provision of a new and improved fastening device for holding a cord in place when wrapped about an electric appliance or the like, the provision of a connector plug having a magnet therein, the provision of a magnet in a lateral face thereof, the provision of a magnet construction for an electric power cord, the provision of an improved cord and plug construction for an electric appliance, and the provision of an improved electric toaster.

These and other objects and advantages will be apparent from the following descriptions of certain specific embodiments of the invention which illustrate how it may be put into practice. In the drawings:

Figures 1 and 2 are respectively a perspective and an elevation of a connector plug embodying the invention;

Fig. 3 is a section taken along the line 3—3 of Fig. 2;

Fig. 4 is an elevation of a second embodiment;

Fig. 5 is a section taken along the line 5—5 of Fig. 4;

Figs. 6 and 7 are sectional elevations of a third embodiment, Fig. 6 being taken along the line 6—6 of Fig. 7, and Fig. 7 being taken along the line 7—7 of Fig. 6;

Figs. 8, 9 and 10 are sectional views of a fourth embodiment, Fig. 9 being taken along the line 9—9 of Fig. 10, and Figs. 8 and 10 being taken along the lines 8—8 and 10—10 respectively of Fig. 9;

Figs. 11 and 12 illustrate a fifth embodiment;

Figs. 13 and 14 are perspective views showing two additional embodiments; and,

Figs. 15 and 16 show an electric toaster embodying the present invention.

In Figs. 1, 2 and 3 a connector 10 for electric power cords includes a body 11 of molded insulating material, such as rubber, having a cord entrance for receiving a cord 12, and blades or prongs 14 for making an electric connection with a mating connector. These elements are the same as in usual connectors or plugs and the details thereof are not a part of this invention. Imbedded in the body 10 is a permanent magnet 16 having its pole faces facing outward from the rest of the connector. In the specific construction of Fig. 1 this magnet 16 is generally disc-shaped with a notch through it for forming the two poles.

This plug of Fig. 1 is adapted to be fastened to the end of the power cord 22 of an electric toaster 20, or electric appliance, as shown in Figs. 15 and 16. When the toaster is to be put away the cord 22 conveniently may be wrapped around the body of the toaster above handles 24 and the end of the cord secured, for preventing the cord from unwrapping, simply by applying the magnet of the plug against the steel case of the toaster. As has been previously mentioned, the surface of a polished and chromium-plated toaster is so smooth that it is difficult to tie such a cord in place and it would also be difficult to support the wrapped cord in place around the toaster, as shown in Fig. 15, simply by friction. Accordingly the use of the handles 24 for this purpose is a distinct advantage. Furthermore, by thus taking advantage of the handles I make it sufficient to have the magnet only strong enough to support the weight of the plug and a short length of the cord. A magnet that could support enough tension on the cord to hold it from slipping down merely by friction would be considerably more expensive and probably so large as to be inconvenient. As is shown in Fig. 16, the magnet may also be applied to the side of the toaster for holding the cord off the floor, as for example when set on a dining table that is being set for a meal.

In Figs. 4 and 5 a thin magnet 28 is imbedded in the insulating body 30 of the connector plug and lies between the internal extensions of the blades 32. In this specific embodiment the magnet 28 is of horseshoe shape and has its two pole faces substantially parallel and flush with the broader face of the plug.

In Figs. 6 and 7 magnet 36 imbedded in the insulating body of the plug lies between the contact blades 38 and extends entirely through the plug so as to have one pole face flush with each of two opposite surfaces. This construction permits either of the two sides of the plug to be applied to the magnetic surface to which the cord is to be attached.

In Figs. 8, 9 and 10 a horseshoe magnet 40 is imbedded in the insulating body 42 of a plug near the cord entrance 44 and in a position surrounding the cord passageway. In this position there is space for a somewhat larger magnet than there is in the constructions of Figs. 4 and 6; consequently it will permit either the use of a magnet of cheaper material or, alternatively, a magnet of much greater holding power in a plug of similar acceptability as to size and shape.

In Figs. 11 and 12 a thin magnet 46 lies between the contact blades of the connector plug and extends from face to face of the insulating body 48. It is of H shape and has four separate pole faces. As seen in Fig. 12, the two upper faces 50 and 51 have the same polarity and the two lower faces 52 and 53 have the other polarity.

The constructions of Figs. 6 and 11 are advantageous in providing magnet poles at opposite sides of a thin flat plug so that either of the two broad faces of the plug will stick to the surface of the toaster or other electric appliance with which it is used. The constructions of Figs. 1, 4, 8 and 11 provide pole faces of opposite polarity on a single face of the plug so that the magnetic circuit may be completed through the ferro-magnetic surface to which the plug is applied for thereby providing a firmer hold. The constructions of Figs. 1 and 4 employ magnets of types that are widely used and therefore readily available. The construction of Fig. 1 employs a highly efficient magnet and also provides an unsymmetrical plug which the user can readily orient by touch.

Figs. 13 and 14 show constructions in which the magnet is supported directly on the power cord rather than on the connector plug. In Fig. 13 a horseshoe magnet 60 fits around the cord and a small key 62 fits into notches in the opposed inner faces of the legs of the U for holding the magnet in place. The key preferably is nonmagnetic and to this end may be composed of brass, synthetic resin, vulcanized fibre or other suitable material, tho it may also be made of steel if sufficiently thin so as to not shunt too much of the magnetic flux. In the construction of Fig. 14 a horseshoe magnet 66 fits about the cord and has notches 68 in the ends of the legs of the U for receiving a fastening band 70 that encircles the magnet and the cord. The band may conveniently be metal or other stiff material formed in situ or may consist of an elastic band such as rubber.

The structures of Figs. 13 and 14 may be of such dimensions as to grip the cord with sufficient pressure that the force required for sliding it along the cord is greater than the force required for holding the cord in place. Generally it will be possible to slide the magnet along the cord simply because the cord will be constructed of a yieldable material. The fact that the magnet is slidable along the cord permits it to be adjusted to a position which will allow it to be applied to any preferred spot on a toaster or the like while still holding the cord taut, as for example for applying the magnet to the broad side of a toaster case when the cord is of such length that a magnet in the plug would come near a corner or other sharply curved part of the toaster body. The structures of Figs. 13 and 14 may be applied to cords already in service.

It is preferable that the magnet pole-face face in a direction lateral of the axis of the cord so that when the plug is applied to the surface of an appliance the cord will lie substantially parallel to the surface, as in Figs. 15 and 16. It is also preferable that the pole-face face in a direction lateral to the axis of the contact blades so that they too lie substantially parallel to the surface to which the magnet is applied. For the sake of compactness and convenience it is desirable that the plug be thin in the direction perpendicular to the pole faces of the magnet and therefore perpendicular also to the surface to which the magnet is applied. It is desirable that such a plug have magnet poles on opposite sides so that either broad face of the plug will stick to a magnetic surface.

The present invention is useful in any electric cord and plug that will be disconnected from the power receptacle from time to time, and is especially useful on small portable appliances. The invention is not limited to the specific embodiments herein shown and described but is capable of modifications and variations within the scope of the appended claims.

I claim:

1. As an article of manufacture, a U-shaped permanent magnet having aligned notches in the two ends thereof adapted to receive a clamping band placed around said magnet for holding an electric cord or the like within the bend thereof.

2. As an article of manufacture, in combination, a U-shaped permanent magnet having opposed notches in the opposed faces of the legs of the U, and a resilient clip in said notches for closing the open end of the U and holding an electric cord or the like within the bend thereof.

3. As an article of manufacture, a U-shaped permanent magnet, and a fastening member for holding an electric cord or the like within the bend of said magnet.

References Cited in the file of this patent

UNITED STATES PATENTS

| | | |
|---|---|---|
| 1,624,741 | Leppke | Apr. 12, 1927 |
| 1,641,880 | Cohen | Sept. 6, 1927 |
| 2,143,529 | White | Jan. 10, 1939 |
| 2,169,219 | Brownstein | Aug. 15, 1939 |
| 2,182,446 | Nelson | Dec. 5, 1939 |
| 2,170,287 | Kinnebrew | Aug. 22, 1939 |
| 2,413,628 | Hinds | Dec. 31, 1946 |
| 2,434,973 | Williams | Jan. 27, 1948 |
| 2,460,173 | Halbing | Jan. 25, 1949 |
| 2,536,776 | Smellie | Jan. 2, 1951 |

FOREIGN PATENTS

| | | |
|---|---|---|
| 259,600 | Switzerland | June 16, 1949 |